United States Patent Office 3,162,904
Patented Dec. 29, 1964

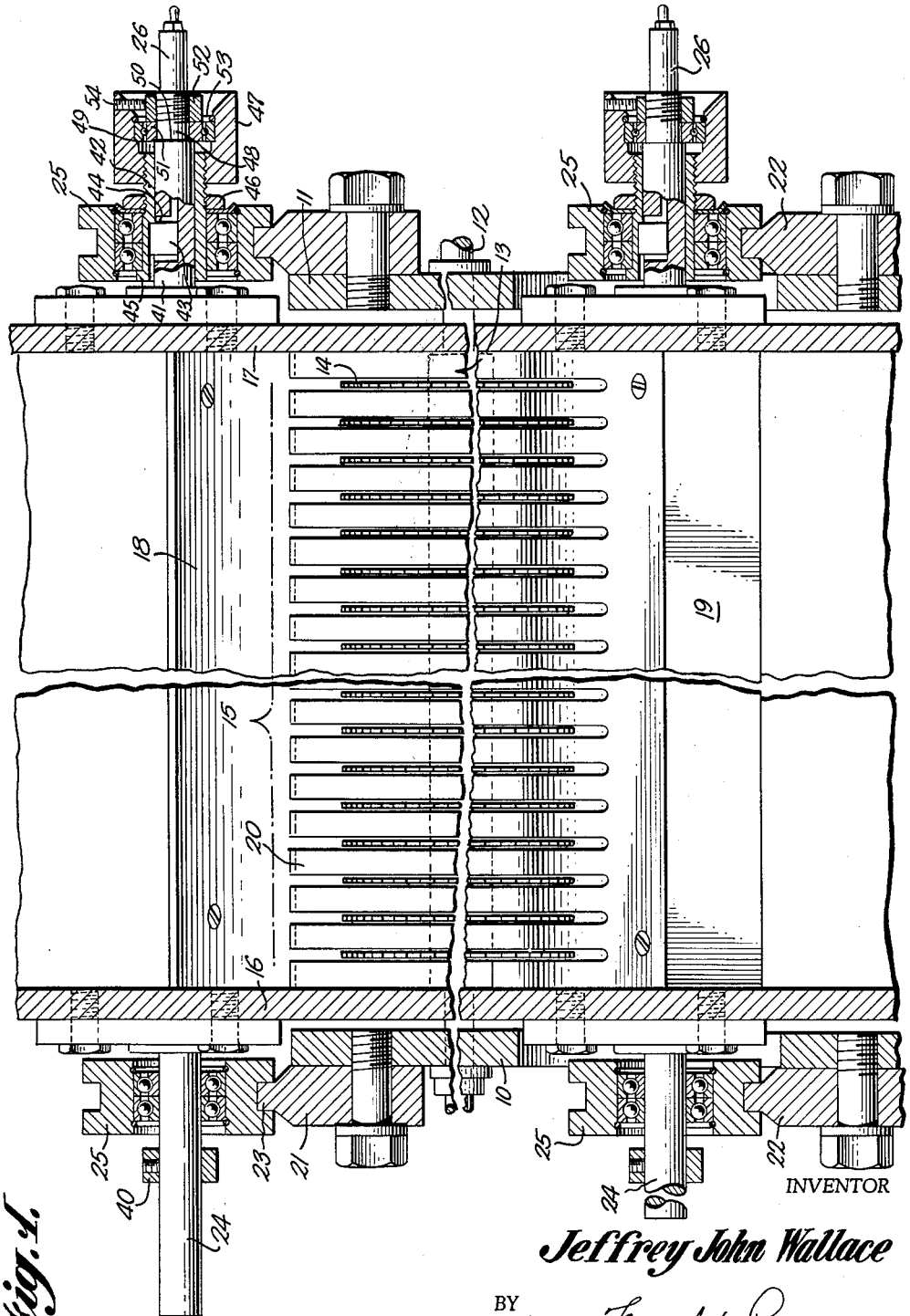

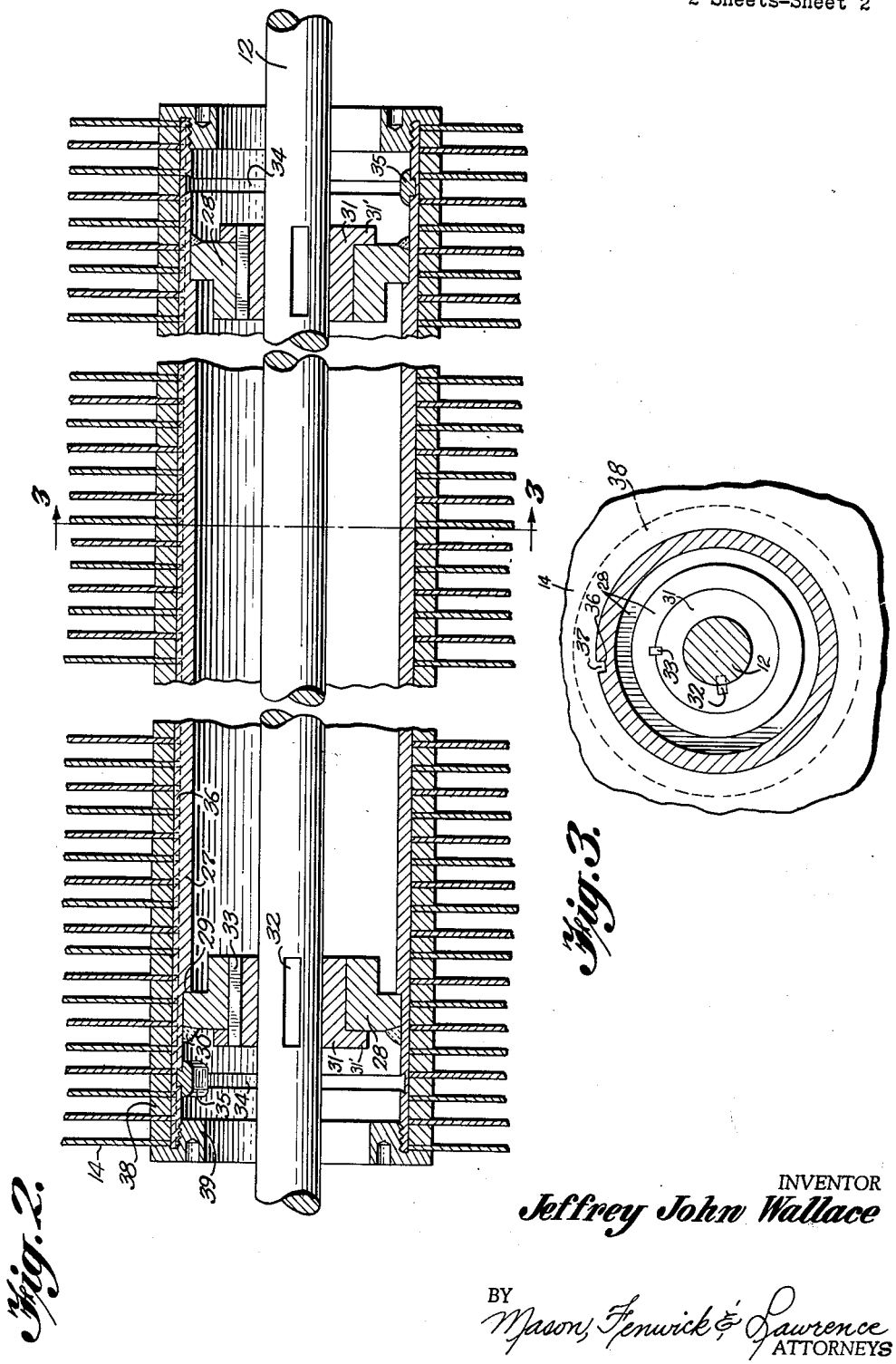

3,162,904
SAW CYLINDERS OF COTTON GINS
Jeffrey John Wallace, Amite, La., assignor, by mesne assignments, to John T. Gordin, J. R. Gillian, Geo. Garrison Potts, jointly, all of Dallas, Tex.
Original application Feb. 21, 1961, Ser. No. 90,802. Divided and this application Nov. 20, 1962, Ser. No. 239,011
5 Claims. (Cl. 19—63)

This invention relates to improvements in the saw cylinders for cotton gins and means for adjusting the clearance between the saws and ginning ribs. This application for patent is a division of my appplication Serial No. 90,802, filed February 21, 1961, entitled Cotton Gin With Slidably Mounted Breasts, and is a continuation in part of application for patent Ser. No. 63,886, filed October 20, 1960, entitled Cotton Gin with Novel Hulling and Ginning Rib Construction, which was abandoned, and refiled as a continuation in part of Ser. No. 63,886 on June 2, 1961, as Ser. No. 116,654 and having the same title.

The improvements in cotton gins forming the subject of application 90,802, have in contemplation a gin of greater capacity than that of present conventional gins, the excess capacity being derived in part from the use of ginning saws of larger diameter than has heretofore been thought feasible for example 16 inches, and the increase in the number of saws, 140 to the cylinder being an example. The increased length and weight of the saw cylinder creates a problem in obtaining rigidity of construction and mounting of the saw cylinder adequate to prevent whipping in operation which would bring the toothed rims of the saws in contact with the ginning ribs and also give rise to the problem of adjusting the clearance between saws and ribs, in view of the impracticability of moving axially so ponderous a unit as the improved saw cylinder.

Therefore it is the general object of the invention to stiffen the saw cylinder so that it will not whip, and to move the ginning ribs laterally, and not the saw cylinder in adjusting the clearance.

Another object of the invention is to mount the saws upon a cylindrical drum coaxial with the drive shaft and of larger diameter, supporting the drum at spaced points within the drum at a distance from its ends so that the length of the span between the points of support is less than the length of the saw cylinder, and part of the load of the saws at each end is carried outboard of the supports.

A further object of the invention is to provide a saw cylinder as described having headers deeply recessed within the ends of the drum, keyed to the drive shaft and accessible from the open ends of the drum.

Still another object of the invention in a saw cylinder as described is the utilization of the inner walls of the recessed ends as the location for adjustably positioned dynamic balance weights.

Other objects of the invention will appear as the description of a practical embodiment thereof proceeds.

In the drawings which accompany and form a part of the following specification, and throughout the figures of which the same reference characters have been used to identify identical parts:

FIGURE 1 is a rear end elevation of a cotton gin embodying the principles of the invention, somewhat fragmentary, having the intermediate portion broken away, and being largely diagrammatic;

FIGURE 2 is a longitudinal axial section through the saw cylinder;

FIGURE 3 is a fragmentary view in cross-section taken along the line 3—3 of FIGURE 2, the peripheral portions of the saws being broken away.

Referring now in detail to the drawings, and first to FIGURE 1, one finds the side members 10 and 11 of the fixed component of a cotton gin, viewed from the rear, such as that disclosed in my application Serial 90,802, in which the drive shaft 12 of the saw cylinder 13 is journalled, the saws being represented by the numeral 14. Beyond the fixed component is the ginning breast 15, represented by the side members 16 and 17 connected respectively adjacent the top and bottom by the upper and lower gin rails 18 and 19. The ginning ribs 20 bridge the space between said gin rails, being secured to the latter, the entire series of ribs constituting the ginning rib front. The ginning breast as shown in FIGURE 1, includes a roll box of which the upper ends of the ribs 20 that extend above the points of emergence of the saws from between the ribs, form part of the wall. A side view of the roll box and its relationship to the large diameter saws is common subject matter in the above referred to continuation in part applications.

Horizontally disposed upper and lower pairs of track bars 21 and 22 are secured to the opposite side members of the fixed component on the outer sides thereof. Said track bars extend forwardly, that is, in a direction away from the observer, the upper, or track edges 23 of each pair being level.

Upper and lower stub shafts 24 are non-rotatably secured to the side member 16 of the ginning breast, a peripherally grooved roller 25 being journalled on each, neatly fitting the track edges so that there is no appreciable side play between the rollers and track edges.

The opposite side member 17 of the ginning breast is likewise provided with upper and lower stub shafts 26 non-rotatably mounted on said member and being respectively coaxial with the corresponding stub shafts 24. The stub shafts 26 also are furnished with rollers 25 which fit the track edges upon which they rest without side play.

The ginning breast is solely supported by the rollers 25, which are slidable upon the stub shafts 24 and 26, and since the rollers have no side play upon the track bars, this makes the ginning breast slidable laterally with respect to the fixed component. The ginning breast is narrower than the fixed component so that its side members 16 and 17 fit telescopically between the side members 10 and 11 of the fixed component, with some clearance, the stub shafts being located sufficiently forward on the side members 16 and 17 to enable the ginning breast to move from a forward position in which the ribs clear the saws to a rearward operative position in which the ribs interdigitate with the saws.

The size and weight of the saw cylinder makes it much more time consuming and difficult to adjust for clearance by shifting the saw cylinder than in the case of conventional cylinders, for, in common with the lighter cylinders the drive shaft must be stopped throwing out of operation other gins which may be connected to the drive shaft in order to serve the one that needs clearance adjusting, the adjustment being a trial and error proposition involving detaching the cylinder from the drive shaft and shifting the cylinder, several trials usually being required before a satisfactory final adjustment is made. Due to the sheer ponderousness of the saw cylinder of the subject invention, each of these steps is more laborious than with the smaller and lighter cylinders, and all the while the other gins whose saw cylinders are driven by the same drive shaft remain out of operation.

In contradistinction to the conventional method the present invention contemplates leaving the saw cylinder fixed to the drive shaft, and making the clearance adjustment solely by shifting the ginning breast including the rib front, relative to the saw cylinder, this being accomplished in the present illustrated embodiment of the invention by adjustably sliding the stub shafts axially through their corresponding rollers, which are laterally immovable with respect to the fixed gin component that supports them and the saw cylinder.

Before describing in detail the specific means for shifting the rib front, it will be expedient at this point to set forth the structure of the saw cylinder itself. Referring to FIGURES 2 and 3 it is seen that the saw cylinder 13 comprises a tubular drum 27, of large diameter open at its extreme ends. This drum is supported in fixed relation to the drive shaft 12 by means of headers 28. The drum is counterbored from both ends, forming shoulders 29 deeply inset from the ends of the drum. The headers abut the shoulders and are welded in place as indicated at 30. The headers have cylindrical openings concentric with the shaft and include flanged annular bushings 31 having flanges 31' at their outer ends which fit into said openings and also fit the drive shaft 12. The bushings are keyed to the drive shaft and to the surrounding headers 28 the respective keys being shown at 32 and 33 in FIGURE 2. The sturdiness of this structure resides in part from the inset position of the headers by which the unsupported span of both the drive shaft and drum is less than the length of the full series of saws, a number of which are carried outboard of the headers at each end, and in part from the inherent stiffness of the drum deriving from its large diameter.

The bushings 31 are relatively large in diameter to bring axially parallel lines passing through the keys 33 in registry with the circular openings through the ringnuts 39 at circumferences substantially radially equidistant from the drive shaft so as to provide the greatest possible range of swing radially in *both directions* for effectively positioning a driving tool against the key. The bushings are flanged at their outer ends so that they will not be displaced by impact of the driving tool against the key.

It is obvious that it would not be practical to provide a key slot the full length of the drive shaft, so the key that fixes the bushing to the drive shaft cannot be a simple straight key but must be one that has to be turned to set or unship it, such for example as a woodruff key. This type of key cannot be manipulated in the confined space within the drum deeply offset from the end so it is necessary to fix the bushings to the drive shaft before it is inserted through the drum, and to free the keys that unite the bushings and headers before the drive shaft, together with the bushings, can be taken out.

In a saw cylinder of this weight and length, approximating ten feet, and with one hundred and forty sixteen inch diameter saws, it becomes necessary to further dampen the vibration of the mass by balancing the saw cylinder dynamically. In view of the substantially complete coverage of the drum with saws there is no room exteriorly for the location of balancing weights. For this purpose the recessed ends of the drum afford an accessible location for the weights. Therefore the inner cylindrical wall of the drum within the recessed ends is provided with circumferential grooves 34 preferably of dovetail cross-section. A lead weight 35 or its equivalent may be adjustably positioned circumferentially of the groove at the point to be counterbalanced. The weight may have a stem fitting the width of the mouth of the groove which will spread to fill the cross-section of the groove when the weight is tapped with a hammer, thus fixing the position of the weight.

The drum 27 has a longitudinal keyway 36 extending the full length of the drum, and the punch holes in the saws 14 which are made to fit the drum, are cut to form tongues 37 which slidably fit the keyway and permit the saws to be slid into place longitudinally of the drum and to prevent their rotation relative thereto. The saws alternate with annular spacers 38, and the spacing has to be quite precise in order for each saw to be equidistant from the ribs between which it operates. A very small cumulative error in spacing may result in excessive longitudinal displacement of the saws near the end of the series. There is a normal clearance of about one eighth of an inch between saw and ribs, so that a very small misalignment could bring at least some of the saws into collisive proximity to the ribs. The saws and spacers are clamped in position by ringnuts 39 having hub portions that screw into the drum at the ends and peripheral flanges that engage the end saws within the projected end area of the spacers, clampably embracing the series of saws and spacers.

For various causes the precise setting between the saws and ribs does not persist but may gradually deteriorate until one or more of the saws makes contact with the adjacent rib, dulling the saw. One of the causes for the saws getting out of adjustment is frictional spot heating of the saws through rubbing contact with the cotton between the hulling and ginning points as they pass through the roll box. The outer portion of the saw runs warmer than the central portion so that, in consequence, the outer portion expands and since the expansion is circumferentially confined by the cooler portion, the outer portion is forced out of planiform shape in one or more places so far as to bring it into contact with an adjacent rib. In the large diameter saws contemplated by the present invention this heat distortion is likely to occur to a more noticeable extent than in conventional saws. Often contact of the saws with the ribs does not occur while the saw cylinder is running at normal speed, for centrifugal force tends to bring the distorted portions of the saw back to planiform position and it is only when the gin is stopping and the speed is decelerating that the grating of the saw teeth against the ribs may be detected by the sound. This being the case it is particularly advantageous for the adjustment for clearance to be made while the saw cylinder is keyed to the drive shaft so that it may be run at low speed while the adjustment is made by shifting the rib front until the sound of engagement of any of the saws with the ribs disappears.

Referring now to the specific means for shifting the rib front relative to the saws, as illustrated in FIGURE 1, it will be noted that all of the rollers 25 are provided with annular ball bearings retained therein through which the stub shafts 24 and 26 slide. A collar 40 is mounted on each of the stub shafts 24, fixed by a set screw at a small distance from the corresponding bearing to form a stop limiting the range of sliding movement of the breast 15.

The stub shafts 26 are each of stepped diameter, the part 41 of largest diameter being next to the side 17 of the breast, providing a seat for the sleeve 42 which is axially slidable on said stub shaft but non-rotatable by virtue of a key 43 carried by the sleeve which extends into a slot 44 in the stub shaft. Said slot is longer than the key, in which slot the key has longitudinal play to the same extent provided by the collars 40 on the stub shafts 24. The roller 25 is freely rotatable upon the sleeve but cannot move in an axial direction, being confined between the flange 45 at the inner end of the sleeve and a nut 46 screwed upon a reduced threaded portion of the sleeve, the roller being snugly journalled between said flange and nut. Obviously the track bar, roller and sleeve form a unit with respect to their incapacity to move laterally, so that the adjusting movement of the ginning breast and rib front has to be made by transmitting force to the stub shafts 26, pushing them in or out relative to the sleeves according to the direction of the adjustment.

The adjusting means comprises a large nut 47, preferably externally cylindrical and knurled to serve as an adjusting knob. It has one end freely threaded upon the adjacent end of the sleeve and is widely counterbored at the other end, the counterbored portion extending about a still further reduced part 48 of the stub shaft, and out of direct contact therewith. The cylindrical wall of the counterbore is formed with a bearing seat defining a shoulder 49, and the stub shaft has a shoulder 50 in the same diametrical plane. An annular bearing 51 surrounds the reduced part 48 of the stub shaft, seating against the shoulders 49 and 50, fitting the bearing seat in the nut and supporting the latter. Said bearing is retained in rotative contact with said shoulders by a nut 52 screwed upon an adjacent threaded portion of the stub shaft, assisted by a snap ring 53. The adjusting nut 47 is thus unitary with the stub shaft with respect to its incapacity of moving axially so that when it is turned it screws in an *on* or *off* direction relative to the fixed sleeve to push itself and stub shaft together with the ginning breast and rib front laterally in one or the other direction, the clearance between the bearing 51 and the inner end of the counterbore being sufficient to allow the incursion of the end of the sleeve to the extent necessary for the maximum adjustment. A set screw 54 threaded radially in the nut 47 may be forced against the nut 52 to fix the adjustment. Ordinarily the adjustment is made by turning the upper and lower nuts in alternation through a small arc at a time while the saw cylinder is being run slowly, until the rasping sound created by saw to rib contact ceases.

One of the notable advantages of this means of laterally adjusting the ginning breast relative to the saw cylinder is that the adjustment may be made wholly from one side of the gin by one man, instead of requiring that complementary adjustments be made at both sides.

While I have in the foregoing specification disclosed a practical embodiment of the invention, it will be understood by those skilled in the art that the specific details of construction and arrangement of parts are by way of example and not to be construed as necessarily limiting the scope of the invention.

What I claim is:

1. In a cotton gin, a saw cylinder comprising a hollow cylindrical drum having a longitudinal keyway in its outer face, a series of saws and spacers in contiguous alternate arrangement mounted on said drum substantially from end to end, the saws being formed with tongues extending into and slidably fitting said keyway, ring-nuts at the ends of said drum having threaded portions screwed to the interior face of said drum and flanged portions in clamped relation to said series of saws and spacers, annular headers fitted within said drum in spaced relation to each other inset from the ends thereof and secured thereto, a drive shaft extending coaxially through said drum with clearance between said shaft and drum, bushings within said headers keyed to said headers and to said drive shaft, fixing said saw cylinder to said drive shaft, the portion of the wall of said drum that spans the space between said headers being of greater thickness than the contiguous end portions, shoulders being defined between the adjacent portions, said headers abutting said shoulders and being fixed in abutting position.

2. In a cotton gin, a saw cylinder comprising a hollow cylindrical drum having a longitudinal keyway in its outer face, a series of saws and spacers in contiguous alternate arrangement mounted on said drum substantially from end to end, the saws being formed with tongues extending into and slidably fitting said keyway, ring-nuts at the ends of said drum having threaded portions screwed to the interior face of said drum and flanged portions in clamped relation to said series of saws and spacers, annular headers fitted within said drum in spaced relation to each other inset from the ends thereof and secured thereto, a drive shaft extending coaxially through said drum with clearance between said shaft and drum, bushings fitted within said headers having flanged outer ends abutting the outer faces of said headers, rectilinear keys for respectively keying said bushings to said drive shaft and to said headers, the keys that couple said bushings and headers being parallel to the drive shaft, and at such radial distance from the drive shaft that a line parallel to the drive shaft, passing through either, will register with the openings of the ring-nuts, whereby a driving tool for seating or removing said keys may be introduced in operative position through said openings.

3. In a cotton gin as claimed in claim 2, the portion of the wall of said drum that spans the space between said headers being of greater thickness than the contiguous end portions, shoulders being defined between the adjacent portions, said headers abutting said shoulders and being fixed in abutting position.

4. In a cotton gin, a saw cylinder comprising a hollow cylindrical drum having a longitudinal keyway in its outer face, a series of saws and spacers in contiguous alternate arrangement, mounted on said drum substantially from end to end, the saws being formed with tongues extending into and slidably fitting said keyway, ring-nuts at the ends of said drum having threaded portions screwed to the interior face of said drum and flanged portions in clamped relation to said series of saws and spacers, annular headers fitted within said drum, inset from said ring-nuts in spaced relation thereto, a drive shaft extending coaxially through said drum with clearance between said shaft and ring-nuts, said shaft being in supporting relation to said headers, the intermediate portion of the wall of said drum that spans the space between said headers being of greater thickness than the contiguous end portions, shoulders being defined between the adjacent portions, said headers abutting said shoulders and being fixed in abutting position.

5. In a cotton gin, a saw cylinder comprising a hollow cylindrical drum having a longitudinal keyway in its outer face, a series of saws and spacers in contiguous alternate arrangement formed with tongues extending into and slidably fitting said keyway, ring-nuts at the ends of said drum having threaded portions screwed to the interior face of said drum and flanged portions in clamped relation to said series of saws and spacers, annular headers fitted within said drum, inset from said ring-nuts in spaced relation thereto at such distance therefrom as to form end chambers peripherally surrounded by some of said saws, and a drive shaft extending coaxially through said drum with clearance between said shaft and ring-nuts, said shaft being in supporting relation to said headers, the surrounding wall of said saw cylinder within one of said chambers being formed with a circumferential channel open throughout its length to said chamber, affording a runway for a selectively positionable balancing weight adapted to be immobilized in adjusted position by deforming it to frictionally engage the walls of said channel.

References Cited by the Examiner
UNITED STATES PATENTS

| 133,080 | 11/72 | Clough | 19—63 X |
| 302,298 | 7/84 | Tatham et al. | 19—97 |
| 314,748 | 3/85 | Strong | 19—63 |
| 1,904,637 | 4/33 | Wallace | 19—55 |
| 1,934,575 | 11/33 | Wallace | 19—63 |
| 2,155,181 | 4/39 | Deems | 19—55 |
| 2,908,047 | 10/59 | Lehman | 19—63 X |

FOREIGN PATENTS 15,059 of 1889 Great Britain.

RUSSELL C. MADER, *Primary Examiner.*
DONALD W. PARKER, *Examiner.*